United States Patent Office 3,223,667
Patented Dec. 14, 1965

3,223,667
THERMOSETTING RESIN COMPOSITION COMPRISING ALKALI BARK DERIVATIVE AND POLYMETHYLOL PHENOL AND ADHESIVE PREPARED THEREFROM
Franklin W. Herrick, Shelton, Wash., and Louis H. Bock, Vancouver, British Columbia, Canada, assignors to Rayonier Incorporated, Shelton, Wash., a corporation of Delaware
No Drawing. Filed Mar. 20, 1961, Ser. No. 96,667
19 Claims. (Cl. 260—29.3)

This application is a continuation-in-part of our applications Serial No. 398,432, filed December 15, 1953; Serial No. 483,181, filed January 20, 1955; Serial No. 564,621, filed February 10, 1956, all now abandoned; and Serial No. 605,725, filed August 23, 1956, now U.S. Patent 3,025,250.

This invention relates to resin-forming or thermo-setting compositions, and has for its object the provision of an improved resin-forming composition advantageously suitable as a thermosetting adhesive, and a process of producing the composition. The composition of the invention comprises an alkali-bark derivative with or without resorcinol, such as a mixture of resorcinol and an alkali-bark derivative of certain coniferous trees and a phenolic compound capable of providing formaldehyde to form an insoluble and infusible resin in combination with either the alkali-bark derivative or said mixture of resorcinol and the alkali-bark derivative.

Our invention provides a composition, preferably in aqueous solution, comprising an alkali-bark derivative which is water soluble and has the capacity of reacting rapidly with formaldehyde to form an insoluble, infusible resin, and a polymethylol phenolic compound which will polymerize to a phenolic resin and will also condense with the alkali-bark derivative to form an insoluble, infusible resin. The invention also provides an aqueous composition comprising a mixture of resorcinol and said alkali-bark derivative, and a polymethylol phenolic compound which will polymerize to a phenolic resin and also condense with the alkali-bark derivative or with the said mixture to form an insoluble, infusible resin. The composition is relatively stable in that it will not set appreciably at ordinary temperatures, even in a few weeks, and can be applied to surfaces to be bonded, and then cured without the addition of free formaldehyde.

The invention provides self-contained thermosetting adhesives comprising a specific type of carefully prepared polymethylol phenol, as a source of formaldehyde, combined with the alkali-bark derivative which may include resorcinol, which adhesives range from relatively slow-curing, inexpensive adhesives for use in making interior types of plywood, up to extremely fast curing, relatively expensive adhesives for use in forming water-resistant, exterior type wood laminates. The slowest setting and least expensive adhesives are formed with the polymethylol phenol and alkali-bark derivative, and the faster curing and more expensive adhesives include resorcinol. The invention provides adhesives that can be varied to meet the job in hand, economically and efficiently.

The polymethylol phenolic compound used in our composition can be formed by reacting a phenol having the two ortho and the para positions free, namely, phenol and m-cresol, with formaldehyde in aqueous solution with caustic alkali to form a compound in which the mole ratio of formaldehyde to phenol is from 2.0 to 3.0. It is one of the important aspects of this invention that free formaldehyde is neither present in nor added to the composition. The polymethylol phenolic compound is a carrier of formaldehyde which becomes reactive by heating and immediately combines with phenolic constituents of the resorcinol or mixture of resorcinol and alkali-bark derivative to form an insoluble, infusible resin in the curing of the composition. This not only eliminates the step of mixing free formaldehyde with the phenolic materials which is an objectionable and time-consuming operation but it avoids the escape of free formaldehyde fumes in the hot pressing operations in applying and curing the adhesive.

Herein the chemical constituent of bark used in forming our composition will be referred to as the "alkali-bark derivative" which is a water-soluble derivative obtained by treating a suitable bark such as various coniferous barks at a temperature of from 90° to 175° C. with an aqueous solution of a suitable alkaline compound in which from 0.03 to 0.20 part of alkaline compound calculated as $Na_2O$ is used to one part of dry bark.

We may use as the alkaline compound for reaction with the bark one of the following compounds: NaOH, KOH, $NH_4OH$, $Na_2S$, $K_2S$, and $(NH_4)_2S$, mixtures thereof, or compounds or mixtures of compounds which produce these alkali compounds in situ, such as a mixture of lime and soda ash. The foregoing alkaline compounds may be characterized in terms of "$Na_2O$ equivalent," meaning the amount thereof equivalent to $Na_2O$ as such.

The alkali-bark derivative has the capacity of reacting very rapidly with formaldehyde, even at room temperature, to reach an insoluble infusible state. Specifically, one part of the alkali-bark derivative calculated on an ash free basis is capable of condensing with at least 0.05 part of formaldehyde when reacted at pH 9.5 for 4 hours at 25° C. Several coniferous barks including hemlock, spruce, Douglas fir, white fir, redwood and southern pine have been found to yield effective alkali-bark derivatives. Alkali-bark derivatives suitable for the purposes of the invention are those which have a formaldehyde reactivity of 5% or more as determined by a test hereinafter described and we may, accordingly, further define our alkali-bark derivative as one having "formaldehyde reactivity of 5% or more."

The alkali-bark derivatives are obtained, in general, by heating a reaction mixture of bark and a water solution of $Na_2O$ equivalent alkali compound, for example, sodium hydroxide, thereby forming a water-soluble alkali derivative of part of the bark, and then separating it from the non-reacted water-insoluble residue. The precise composition of this alkali-bark derivative is not fully known since it is derived from a mixture of certain polymeric phenolic materials of the bark, but not all of the complex organic hydroxy compounds thereof. It contains various polymeric phenolic materials which may be precipitated from water solution by carbon dioxide. A 30% solution of the alkali-bark product in aqueous sodium hydroxide solution at 50° C. results in a gel in about three minutes upon adding formaldehyde. This reaction with formaldehyde proceeds so rapidly to the formation of an amorphous insoluble product that it cannot be controlled for forming thermosetting plastics. The desired water-soluble alkali-bark derivative is soluble in water solutions of alkalis and may be separated from the undesired organic constituents of the bark by methods of chemical treatment hereinafter to be described in more detail.

The barks of different species of trees vary greatly in their content of alkali-reactive material which is capable of producing the type of resin base described in this invention. The bark of the western hemlock (*Tsuga heterophylla*) is particularly useful for this purpose. Other trees whose bark yields alkali-derivatives useful in this invention are: Douglas fir (*Pseudotsuga taxifolia*), western white fir (*Abies concolor, Abies grandis* and *Abies ama-*

*bilis*), Sitka spruce (*Picea sitchensis*), coast redwood (*Sequoia sempervirens*), eastern hemlock (*Tsuga canadensis*), and southern yellow pine (*Pinus echinata, Pinus palustris, Pinus taeda, Pinus caribaea* and *Pinus rigida* var. *serotina*).

The alkali-bark derivative undoubtedly contains phenolic groups and these are probably responsible for the reactivity with formaldehyde. A quantitative test for this reactivity is as follows:

In a 500 ml. beaker, an accurately weighed sample (about 20 g.) of the bark material and approximately 300 ml. of water are well mixed. The pH of the solution is adjusted to 9.5 by adding dropwise 5–10% sodium hydroxide or hydrochloric acid as required. The solution is then washed into a 500 ml. volumetric flask and 25 ml. of 37% formaldehyde is added. Water is then added to make 500 ml.

A blank determination is made by adding 25 ml. of 37% formaldehyde to a 500 ml. volumetric flask and diluting to volume with water. Five ml. of this solution is added to 50 ml. of water and 10 ml. of 10% sodium sulfite solution. This solution is titrated to pH 9.5 with 0.1 N hydrochloric acid. The reaction is as follows:

$$CH_2O + Na_2SO_3 + H_2O \rightarrow CH_2O \cdot NaHSO_3 + NaOH$$

From this titration is calculated the initial formaldehyde concentration.

After four hours a 5 ml. sample of the original solution is withdrawn, diluted with 50 ml. of water and adjusted to pH 7 with 0.1 N hydrochloric acid. To this solution is added 10 ml. of 10% sodium sulfite solution and it is then titrated with 0.1 N hydrochloric acid to pH 9.5. From this value is calculated the amount of formaldehyde remaining after four hours.

The formaldehyde which has condensed with the bark is determined by subtracting the formaldehyde found in the four hour sample from that found in the blank. This is expressed as grams of formaldehyde per 100 g. of dry, ash free bark material.

The above method of determining formaldehyde was described by Lemme. Chem. Ztg. 27, 896 (1903).

Various alkali bark products were analyzed by the above process with the following results:

are not satisfactory as raw materials for the practice of this invention.

This invention involves the discovery that resorcinol alone or a mixture of resorcinol and an alkali-bark derivative, from a suitable coniferous bark, and the polymethylol phenol compound in aqueous solution in suitable proportions form a stable adhesive composition from which formaldehyde does not escape, and which, on heating condenses to combine polymethylol phenol with resorcinol or with resorcinol and alkali-bark derivative into an infusible resin. The thermosetting composition of the invention has a desirable resistance to self-condensation under ordinary temperature and atmospheric conditions while having rapid thermosetting properties when heated, thereby rendering it useful for many purposes for which fluid alkaline thermosetting phenol formaldehyde condensation products are useful. The compositions of the invention when used as thermosetting adhesives, advantageously applicable in manufacturing composite wood products, as well as for many other purposes for which fluid thermosetting components are useful, are preferably in the form of aqueous solutions and in such form can be applied to the surfaces to be adhesively bonded together.

Phenol has three reactive positions and each molecule can react with three molecules of formaldehyde. This was demonstrated by Granger, Ind. Eng. Chem. 29, 860 (1937), and the product, trimethylol phenol, was recently isolated from this reaction by Freeman, J.A.C.S. 74, 6257 (1952). When phenol and excess formaldehyde is heated under alkaline conditions, an insoluble, infusible resin is formed in which the ratio of formaldehyde to phenol is about 1.5 to 1.6. If the condensation went infinitely far the ratio would be 1.5, but actually there are end groups which may contain free methylol groups, so the ratio is slightly above 1.5. If trimethylol phenol is heated in the presence of alkali, it will form the same end-product with a formaldehyde-phenol ratio of about 1.5 to 1.6. The excess formaldehyde is split out in the reaction. We have found that trimethylol phenol or a formaldehyde-phenol condensate having a mole ratio of over 1.6 can be mixed with an alkaline solution of the alkali-bark derivative to form a stable solution which can be stored for 30 days or more at room temperature. This

FORMALDEHYDE REACTIVITY OF BARK DERIVATIVES

| Species | NaOH Na$_2$O/bark [1] | Na$_2$S Na$_2$O/bark [2] | Temp., °C. | Time | Formaldehyde reactivity |
|---|---|---|---|---|---|
| Western hemlock | 0.05 | | 97 | 2 hrs | 7.4 |
| Do | 0.05 | | 125 | 5 min | 9.7 |
| Do | 0.05 | | 150 | 5 min | 8.4 |
| Do | | 0.05 | 150 | 2 hrs | 6.5 |
| Do | 0.0375 | 0.0125 | 97 | 2 hrs | 9.8 |
| Do | | 0.06 | 175 | 5 min | 6.8 |
| Do | | 0.20 | 90 | 2 hrs | 9.6 |
| Douglas fir | 0.05 | | 97 | 2 hrs | 7.2 |
| Do | 0.05 | | 150 | 2 hrs | 6.4 |
| Do | 0.20 | | 90 | 2 hrs | 6.7 |
| Do | | 0.05 | 97 | 2 hrs | 7.4 |
| White fir | 0.05 | | 97 | 2 hrs | 6.6 |
| Do | 0.05 | | 150 | 2 hrs | 5.1 |
| Do | 0.20 | | 90 | 2 hrs | 9.7 |
| Do | | 0.05 | 97 | 2 hrs | 6.8 |
| Southern yellow pine | 0.05 | | 97 | 2 hrs | 6.0 |
| Do | 0.20 | | 90 | 2 hrs | 9.1 |
| Sitka spruce | 0.05 | | 97 | 2 hrs | 6.0 |
| Do | 0.20 | | 90 | 2 hrs | 8.9 |
| Do | | 0.05 | 97 | 2 hrs | 8.4 |
| Redwood | 0.05 | | 97 | 2 hrs | 6.0 |
| Do | 0.05 | | 150 | 2 hrs | 6.3 |
| Do | 0.2 | | 90 | 2 hrs | 8.5 |
| Western red cedar | 0.05 | | 97 | 2 hrs | 3.9 |
| Alder | 0.05 | | 97 | 2 hrs | 2.4 |
| Black gum | 0.05 | | 97 | 2 hrs | 3.0 |

[1] Means the Na$_2$O weight equivalent of NaOH per part of dry bark.
[2] Means the Na$_2$O weight equivalent of Na$_2$S per part of dry bark.

All the alkali-bark derivatives which had a formaldehyde reactivity of 5% or more by this test were found to be effective in the formation of adhesive by our process. All these barks which had reactivities below 4% were ineffective, i.e. the last three examples in the above list solution contains all the components required for a thermosetting adhesive and can be applied, pressed and cured by heating. The material is an effective plywood adhesive capable of being used in the production of exterior grade plywood.

It is important that the polymethylol phenol condensate used in the present invention contain no free formaldehyde. If free formaldehyde is present, it will react immediately with the resorcinol or mixture of resorcinol and alkali-bark derivative causing the solution to gel. We have found that formaldehyde reacts very rapidly with phenol in the presence of a high molar ratio of sodium hydroxide. In the presence of about 0.75 mole of sodium hydroxide per mole of phenol, the reaction with formaldehyde is strongly exothermic and the reaction mixture heats up to refluxing temperature of its own accord. If the reaction mixture is cooled rapidly after the exotherm has subsided the solution is free of formaldehyde, provided the ratio of formaldehyde to phenol is less than 3. The Cannizzaro reaction in which formaldehyde is converted to methanol and sodium formate is also favored by high mole ratios of sodium hydroxide and high temperatures. However, the reaction rate of the Cannizzaro reaction is slower than the rate of reaction of formaldehyde with phenol under these conditions. If the strongly alkaline solution of polymethylol phenol is heated, another reaction occurs which results in the condensation of the polymethylol phenol to a polymer and the simultaneous liberation of formaldehyde.

The formation of trimethylol phenol, its condensation and the Cannizzaro reaction are illustrated by the following equations:

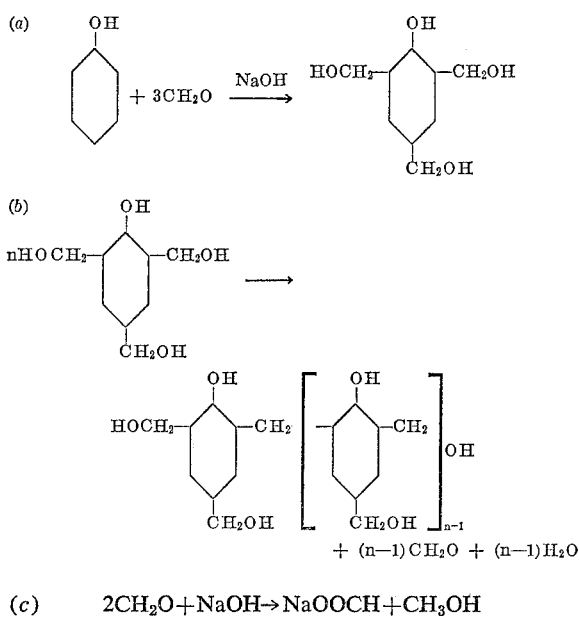

(c)    $2CH_2O + NaOH \rightarrow NaOOCH + CH_3OH$

In the reaction (b) free formaldehyde is liberated and a polymer containing a lower ratio of formaldehyde to phenol is formed. The free formaldehyde is objectionable as indicated above, since it will react rapidly when mixed with the resorcinol or mixture of resorcinal and alkali-bark derivative. The loss of reactive methylol groups in the polymethylol phenol is also a disadvantage since there are then fewer reactive positions available to react with the alkali-bark derivative. The Cannizzaro reaction (c) should be avoided since it merely results in the loss of valuable formaldehyde.

When a polymethylol phenol solution is mixed with a solution of resorcinol or a mixture of resorcinol and an alkali-bark derivative there is substantially no reaction at room temperature. Such a solution can be stored for weeks with only a slight increase in viscosity. When the solution is evaporated and heated reaction (b) can occur. The liberated formaldehyde can then react with the resorcinol or alkali-bark derivative forming an insoluble, infusible resin. A more likely reaction is that the polymethylol phenol may condense directly with the resorcinol or said mixture without splitting out free formaldehyde, as illustrated below:

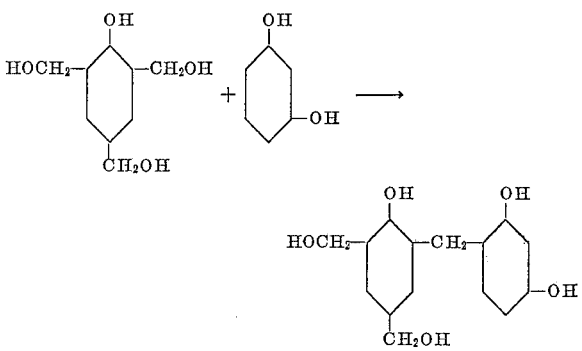

It is to be understood therefore that in discussing the excess or released free formaldehyde which reacts with the resorcinol or alkali-bark derivative, its existence may not be of finite duration. It may be of such an evanescent nature that it serves as a coupling radical and we accordingly are concerned with its capacity to effect polymerization and not with its status as a possible free material.

This last reaction could continue until a three-dimensional solid polymer was formed. We do not know which mechanism is followed in the curing of the resin formed from polymethylol phenol, the resorcinol or alkali-bark derivative. The important part is that this combination is reasonably stable to storage and can be cured to an insoluble, infusible resin which is effective as an adhesive, and particularly as an adhesive for bonding wood particle boards and plywood.

Resorcinol has 3 reactive positions for reaction with formaldehyde or a methylol compound. These positions are ortho and para to the hydroxyl groups, as indicated by numerals in the formula below:

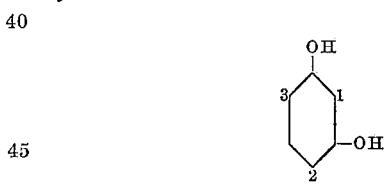

The polymethylol phenol derivative used in our preferred composition is assumed to be a mixture of dimethylol phenol and trimethylol phenol. Dimethylol phenol is bifunctional while trimethylol phenol is trifunctional. A bifunctional reagent reacts with resorcinol to form a linear polymer, provided the ratio of bifunctional reagent to resorcinol is not over 1.0. If D represents dimethylol phenol and R represents resorcinol, the linear polymer can be represented as follows:

$$—R—D—R—D—$$

Such a linear polymer is fusible and not thermosetting. If the mole ratio is over 1.0, a cross linked infusible resin results.

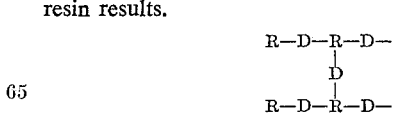

A trifunctional reagent reacts with resorcinol to form a linear polymer, provided the ratio of trifunctional reagent to resorcinol is not over 0.5. Such a polymer is represented below in which T represents a molecule of trimethylol phenol.

when the ratio of T to R is over 0.5, a three-dimensional infusible polymer results.

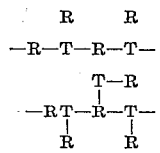

The polymethylol phenol containing a mol ratio of formaldehyde to phenol of 2.5 is an equimolecular mixture of dimethylol phenol and trimethylol phenol. When this mixture is used with resorcinol, a linear polymer results at a ratio of 0.67 polymethylol phenol (D+T) to resorcinol (R)

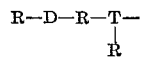

Therefore, in using an equimolecular mixture of dimethylol phenol and trimethylol phenol such as used in Examples 6, 8 and 9, a mole ratio of over 0.67 polymethylol phenol to resorcinol should permit cross linking and result in a thermosetting resin.

In forming the polymethylol phenolic compound, we may use phenol, the 85% commercial phenol, m-cresol or mixtures thereof, which have three ortho and para positions free, and combine therewith in sodium hydroxide aqueous solution enough formaldehyde so that the mole ratio of formaldehyde to phenol is from 2.0 to 3.0, and advantageously in which the ratio is nearer 3.0. If the formaldehyde be present in excess of 3.0, free formaldehyde would be present. We prefer to leave the polymethylol phenolic compound in the aqueous solution in which it is formed and to add it directly to the aqueous solution of resorcinol or mixture of resorcinol and alkali-bark derivative, thereby providing a desirable amount of alkali in the composition.

When forming adhesives of higher viscosities than generally result from the aforementioned compositions, we use a resorcinol product that is partially condensed with polymethylol phenol, and then form the composition with polymethylol phenol as herein described. We prefer not to use alkali-bark derivative in this composition.

The invention will be described more in detail with reference to the examples which set forth specific illustrative embodiments of the alkali-bark derivative, resorcinol and alkali-bark derivative in combination, the polymethylol phenolic compounds and the thermosetting composition, and the use of the composition in the adhesive bonding of plywood.

The preparation of alkali-bark derivatives is illustrated by the following examples:

Example 1

Western hemlock bark was hogged to sizes not larger than that which will pass a screen of about 2 meshes to the inch. To a quantity of moist bark, corresponding to 100 parts of dry bark, was added sodium hydroxide solution containing 6.5 parts of sodium hydroxide and water to make a total of 670 parts. The charge was heated to 97° C. with stirring and was held at this temperature for two hours, at which time the reaction was substantially complete. The resulting reaction mixture was drained on a screen of about 60 x 40 meshes to the inch, and the residue was compressed to remove the solution of alkali bark derivative thus produced. The resulting solution was clarified and spray dried. The dried derivative was water soluble and the gross yield was 37.2 parts of dry powder per 100 parts of dry bark.

Example 2

An autoclave equipped with mechanical agitator was charged with a quantity of western hemlock bark corresponding to 100 parts of dry bark, 6.3 parts of sodium sulfide and water to make a total of 670 parts. The mixture was heated to 150° C. over a period of 1 hour and 40 minutes and agitated at that temperature for 2 hours. The bark product was isolated as in Example 1. The dried material was water soluble and the gross yield was 46.6 parts of dry powder per 100 parts of dry bark.

The "dry" bark mentioned in Examples 1 and 2 was bark dried at about 105° C.

The following examples illustrate the preparation of the polymethylol phenol.

Example 3

A reaction vessel equipped with an efficient cooling coil, a mechanical stirrer and reflux condenser was charged with 88.5 parts of phenol. To this was added a solution of 213 parts of 34.5% formaldehyde, 26.6 parts of sodium hydroxide and 50 parts of water. The mixture was stirred without heating. The temperature rose rapidly because of the exothermic character of the reaction and reached the boiling point of the solution. After refluxing for about 10 minutes the reaction subsided and the solution was cooled rapidly to room temperature by running cold water through the cooling coil. Analysis for formaldehyde in the finished solution showed this to be absent. Titration with 0.1 N hydrochloric acid showed 25 parts of NaOH remaining. The loss of sodium hydroxide is accounted for by the Cannizzaro reaction and corresponds to the reaction of 2.4 parts of formaldehyde. The remainder of the formaldehyde used condensed with the phenol. The mole ratio of formaldehyde condensed with phenol is 2.52. The solution was very thin (less than 10 centipoises at 25° and a calculated concentration of 49.5% solids). On standing it deposited fine white crystals of the sodium salt of polymethylol phenol.

Example 4

A reaction vessel equipped with an efficient cooling coil, a mechanical stirrer and reflux condenser was charged with 94 parts of phenol, 91.2 parts of paraformaldehyde and 124 parts of water. While stirring a solution containing 22 parts of sodium hydroxide in 100 parts of water, heat was applied to initiate the reaction. An exothermic reaction occurred following which the solution was rapidly cooled to room temperature. Analysis showed no free formaldehyde. Titration with 0.1 N hydrochloric acid indicated a total loss of 1.5 parts of formaldehyde by Cannizzaro reaction. The ratio of combined formaldehyde to phenol was 2.85. The viscosity of the solution was less than 10 centipoises at 25° C.

Example 5

A reaction vessel as in Example 3 was charged with 94 parts of phenol and a solution of 171 parts of 37% formaldehyde. To this was added 30 parts of sodium hydroxide and 50 parts of water. The mixture was stirred without heating. The temperature rose rapidly because of the exothermic character of the reaction and reached the boiling point of the solution. It was then cooled to room temperature and analyzed for free formaldehyde. There was no free formaldehyde. The viscosity of the solution was less than 10 centipoises at 25° C.

Example 6

A reaction vessel equipped with mechanical agitator, reflux condenser and cooling jacket was charged with 25.4 parts of 94.5% phenol and 54 parts of 37% formaldehyde. The solution was cooled to 20–25° C. and 20.6 parts of 36% sodium hydroxide solution was added. The agitator was started and the temperature rose, due to the heat of reaction to 65° C. in 13 minutes. Cooling water was then turned into the jacket and the temperature rose more gradually to 85° C. in 8 minutes. Hot water was then turned into the jacket to bring the reaction temperature to 92° C. where the mixture was refluxed.

The hot water was then turned off and the mixture continued to reflux for 30 minutes, at which time cold water was turned into the jacket to cool the mixture and stop the reaction. The resulting solution had a specific gravity of 1.195, a cured resin solids of 47.2% and a viscosity at 25° C. of 41 centipoises.

In a like manner various polymethylol phenol solutions were prepared using mole ratios of sodium hydroxide to phenol of 0.55 to 1.0 and mole ratios of formaldehyde to phenol of 2.0 to 3.0. All of these were effective in the preparation of the adhesive by mixing with resorcinol and/or the alkali-bark derivative. However, in the case of low formaldehyde to phenol ratios (2.0 to 2.25) a higher proportion of polymethylol phenol to bark derivative is required. From an economic standpoint the polymethylol phenols containing the higher formaldehyde-to-phenol ratios are preferred because the ratio of phenol to alkali-bark derivative necessary for an effective adhesive is lower and the resulting adhesive is thus lower in cost.

We prefer not to separate the polymethylol phenol from the solution in which it was formed because the residual sodium hydroxide stabilizes the trimethylol phenol. Moreover, the sodium hydroxide aids in setting the adhesive composition formed on mixing with the solution of the alkali-bark derivative.

The following example shows the relationship between viscosity and combined formaldehyde in polymethylol phenol preparation and the corresponding efficacy of these preparations in the bark derivative plywood adhesive.

Example 7

A reaction vessel equipped with mechanical stirrer, a reflux condenser and a cooling coil was charged with 993 parts of commercial phenol containing 10 moles of phenol by analysis and 2100 parts of 36.4% formaldehyde solution corresponding to 25.53 moles. A solution of 300 parts of sodium hydroxide in 500 parts of water was added at 20° C. with stirring, the same being continued throughout the operation. The temperature rose rapidly to refluxing (91° C.) and 200 ml. samples were removed at intervals. The samples, as removed, were quickly cooled to 25° C. and the viscosity, solids and free alkalinity determined. Free formaldehyde was also determined by neutralizing the solution with hydrochloric acid, adding hydroxylamine hydrochloride and titrating the liberated hydrochloric acid with standard sodium hydroxide solution.

After 15 minutes at refluxing temperature, the free formaldehyde had all disappeared. The formaldehyde consumed in the Cannizzaro reaction was determined by the following calculation:

Moles $CH_2O$ in Cannizzaro = (total moles NaOH at start minus moles NaOH remaining at sampling time) $\times 2$.

Ratio of combined $CH_2O$ to phenol equals:

$$\frac{\text{Total moles } CH_2O \text{ at start} - \text{moles } CH_2O \text{ in Cannizzaro}}{\text{Moles phenol at start}}$$

The results obtained are tabulated in Table 1.

TABLE 1

| Sample No. | Time in min. | Viscosity in centipoises | Ratio combined $CH_2O$ to Phenol (x) | No. of phenol units per molecule |
|---|---|---|---|---|
| 1 | 30 | 46.5 | 2.466 | 2.14 |
| 2 | 60 | 54.0 | 2.384 | 2.60 |
| 3 | 90 | 80.5 | 2.345 | 3.10 |
| 4 | 135 | 210 | 2.282 | 3.55 |
| 5 | 165 | 440 | 2.253 | 3.95 |
| 6 | 195 | 980 | 2.206 | 4.85 |

Standard plywood adhesives were prepared using samples 3, 4, 5 and 6 above. 100 parts of alkali-bark derivative, 163 parts of the above solution and 168 parts of water were mixed to form the adhesive solution. To each 100 parts of said solution, 8 parts of Furafil was added to give the final adhesive mix. The adhesive mix was applied to 1/10 inch Douglas fir veneer at a spread of 55 lb./Mdgl. Three-ply panels were prepared. Assembly time was 10 minutes. The panels were pressed, two to an opening, at 175 p.s.i. and 285° F. for 6 minutes. They were then placed in an oven at 175° F. for 4 hours to simulate a hot stack. The standard plywood boil tests obtained in this manner are given in Table 2.

TABLE 2

| Sample No. | Product of Example 7 | Viscosity in centipoises of— | | Plywood boil test | |
|---|---|---|---|---|---|
| | | Adhesive solution | Adhesive mix | Shear strength | Wood failure, percent |
| 1 | 80.5 | 1,100 | 2,300 | 169 | 97 |
| 2 | 210 | 1,700 | 6,050 | 146 | 85 |
| 3 | 440 | 3,400 | 14,000 | 120 | 82 |
| 4 | 980 | 6,000 | 44,000 | 118 | 77 |

It is evident from these results that as the viscosity of the polymethylol phenol increases and the number of available methylol groups decreases, the plywood adhesive properties become poorer.

For practical purposes, a polymethylol phenol viscosity of not over 200 centipoises corresponding to an "$x$" value of 2.3 and an "$n$" value of 3.0 is the upper limit of condensation for the formulation using 39 parts of phenol as polymethylol phenol per 100 parts of alkali-bark derivative. Polymethylol phenol preparations of lower viscosity are readily prepared and are more effective in plywood adhesives. It is to be understood, however, that more highly condensed polymethylol phenol preparations can be used, provided that the ratio of phenol to alkali-bark derivative in the adhesive formulation is higher. Since polymethylol phenol is much more expensive than the alkali-bark derivative, however, it is advantageous to use a minimum amount.

Other adhesive compositions of the invention were prepared by mixing solutions of alkali-bark derivative and polymethylol phenol at room temperature. A typical adhesive was prepared as follows:

Example 8

A solution of alkali-bark derivative was prepared by dissolving 100 parts of the product of Example 1 in a solution of 206 parts of water containing 4 parts of sodium hydroxide. To the resulting solution was added 130 parts of the polymethylol phenol solution prepared in Example 3. The mixture was stirred at room temperature until homogeneous. The resulting solution had a viscosity of 360 centipoises and a concentration of 40% solids.

Example 9

A solution of alkali-bark derivative was prepared by dissolving 100 parts of the product of Example 2 in a solution of 206 parts of water containing 4 parts of sodium hydroxide. To the resulting solution was added 130 parts of the polymethylol phenol solution prepared in Example 3. The mixture was stirred at room temperature until homogeneous. The resulting composition had a viscosity of 550 centipoises and a concentration of 40% solids.

The dry alkali-bark derivative of Example 1 could be dissolved in water without adding the sodium hydroxide, as in Examples 8 and 9.

The use of the adhesive compositions in making plywood is illustrated in the following examples.

Example 10

The composition described in Example 8 was mixed with 8 parts of walnut shell flour per 100 parts of solution and the mixture was applied to 1/10 inch Douglas fir veener at a spread of 60 lbs. per 1000 sq. ft. of double glue line to make a three ply board. This was allowed to stand in closed assembly for 30 minutes and then pressed at 150 lbs. per sq. in. between steam heated platens at 140° C. for 10 minutes. The resulting plywood was tested for exterior type plywood according to Commercial Standards CS 45–55. Five panels were tested and the results were averaged. The average dry shear was 281 lbs. per sq. in. with 94% wood failure. The boil test gave a wet shear of 201 lbs. per sq. in. with 92% wood failure.

*Example 11*

An adhesive was prepared by dissolving 100 parts of the alkali-bark derivative of Example 1 in 246 parts of water and 1.2 parts of NaOH. The resulting solution was added to 253 parts of the polymethylol phenol solution of Example 5. This solution was applied as in Example 10 for the preparation of plywood and pressed as described there. The boil test gave a wet shear of 233 lbs. per sq. in. with 91% wood failure.

*Example 12*

An adhesive was prepared by dissolving 100 parts of the alkali-bark derivative of Example 1 in 67.3 parts of the polymethylol phenol solution of Example 4 and 190 parts of water. This solution was applied as in Example 10 for the preparation of plywood and pressed as described there. The boil test gave a wet shear of 77 lbs. per sq. in. with 72% wood failure.

*Example 13*

The composition described in Example 9 was mixed with 8 parts of walnut shell flour per 100 parts of solution and the mixture was applied to 1/10 inch Douglas fir veneer at a spread of 60 lbs. per 1,000 sq. ft. of double glue line to make a three ply board. This coated board was allowed to stand in closed assembly for 30 minutes, and then pressed at 150 lbs. per sq. in. between steam heated platens at 140° C. for 10 minutes. The resulting plywood was tested for exterior type plywood according to Commercial Standards CS 45–55. Five panels were tested and the results were averaged. The average dry shear was 187 lbs. per sq. in. with 93% wood failure. The boil test gave a wet shear of 156 lbs. per sq. in. with 88% wood failure.

In general it has been found that the ratio of polymethylol phenol to alkali-bark derivative necessary to give a good plywood adhesive is such that the theoretically libreated formaldehyde is in a ratio of, at least, 0.2 mole per 100 g. of alkali-bark derivative. This is calculated as follows: the formaldehyde that can be liberated is that in excess of 1.5 moles per mole of phenol. In the case of Example 4, the ratio of combined formaldehyde to phenol was 2.85. Subtracting 1.5 from this leaves 1.35 moles per mole of phenol. In Example 12, the ratio of phenol to alkali-bark derivative was 15 g. per 100 g. of alkali-bark derivative. The formaldehyde available for reaction with alkali-bark derivative is thus:

$$\frac{1.35 \times 15}{94} = 0.216$$

per mole per 100 g. of alkali-bark derivative.

Adhesive compositions of the invention were prepared by mixing solutions of resorcinol and an alkali-bark derivative with polymethylol phenol at room temperature.

*Example 14*

A solution was prepared by mixing 200 parts of an alkaline solution of polymethylol phenol containing 2.6 moles of formaldehyde combined with each mole of phenol and having a concentration of 53% solids (24% phenol), 28 parts of resorcinol, 33.6 parts of alkali-bark extract of Example 1, and 158.4 parts of water.

To 100 parts of this solution was added 8 parts of walnut shell flour. The mixture was applied to Douglas fir veneer at a spread of 75 lbs. per 1,000 sq. ft. of double glue line to make a three-ply board. This was then pressed at 150 lbs. per sq. in. between steam heated platens at 140° C. temperature. The resultant plywood had a boil test which gave a wet shear of 202 lbs. per sq. in. with 81% wood failure.

In forming the compositions of the invention we use at least 0.67 moles of polymethylol phenol (containing 2.5 moles of formaldehyde to each mole of phenol) per mole of resorcinol. In general, it has been found that the ratio of polymethylol phenol to alkali-bark derivative necessary to give a good plywood adhesive is 0.2 mole per 100 g. of alkali-bark derivative. When forming a composition comprising polymethylol phenol and a mixture of resorcinol and alkali-bark derivative, the ratio of moles of polymethylol phenol to 100 g. of the mixture will vary from at least 0.2 for 100% alkali-bark derivative to at least 0.67 mole for 100% resorcinol, depending on the proportionate amounts for each. It is understood that larger ratios of polymethylol phenol can be used, but in the case of the alkali-bark derivative there would be no economic advantage.

We claim:

1. A thermosetting composition comprising an alkali-bark derivative from a coniferous bark prepared by digesting coniferous bark with an aqueous solution of an alkaline compound of the group consisting of NaOH, KOH, NH$_4$OH, Na$_2$S, K$_2$S and (NH$_4$)$_2$S and removing the water-soluble alkali-bark derivative from the unreacted bark, said alkali-bark derivative having a formaldehyde reactivity of at least 5%, and a polymethylol phenol compound in which the mole ratio of formaldehyde to phenol is from 2.0 to 3.0, said composition when in aqueous solution being condensible to an insoluble, infusible resin by heat, the polymethylol phenol compound providing formaldehyde which reacts with phenolic constituents of the alkali-bark derivative in forming the resin.

2. A thermosetting composition according to claim 1 in which the polymethylol phenol compound contains a mixture of monomeric polymethylol phenols and low condensation products.

3. A thermosetting composition according to claim 1 in which the alkali-bark derivative is from a bark of the group consisting of hemlock, spruce, Douglas fir, white fir, redwood and southern yellow pine.

4. A thermosetting adhesive composition in aqueous solution comprising an alkali-bark derivative prepared by digesting coniferous bark with an aqueous solution of an alkaline compound of the group consisting of NaOH, KOH, NH$_4$OH, Na$_2$S, K$_2$S and (NH$_4$)$_2$S and removing the water-soluble alkali-bark derivative from the unreacted bark, said alkali-bark derivative having a formaldehyde reactivity of at least 5%, a polymethylol phenol compound having a mole ratio of formaldehyde to phenol of from 2.0 to 3.0, said alkali-bark derivative being an aromatic hydroxy compound obtained by heating a coniferous bark of the group consisting of hemlock, spruce, Douglas fir, white fir, redwood, and southern yellow pine in a water solution of an alkaline compound in the proportion of about 0.03 to about 0.20 part of Na$_2$O equivalent per part of dry bark until the alkali is substantially all combined with the bark and separating from the bark in an aqueous solution the alkali-bark derivative, said polymethylol compound being capable on heating the composition of condensing with the bark derivative to form an insoluble and infusible resin.

5. An adhesive composition comprising an alkali-bark derivative, a polymethylol phenol compound in which the mole ratio of combined formaldehyde to phenol is from 2.0 to 3.0, said alkali-bark derivative being the product of reacting a coniferous bark of the group consisting of hemlock, spruce, redwood, Douglas fir, white fir, and southern yellow pine with an alkaline compound in aqueous solution and separating water soluble alkali-bark derivative from bark residue, said alkali-bark derivative having a formaldehyde reactivity of at least 5%, said polymethylol phenol being present in amount sufficient to release enough formaldehyde to polymerize the phenolic constituent of the alkali-bark derivative and form an insoluble and infusible resin.

6. A thermosetting adhesive composition in aqueous solution comprising an alkali-bark derivative formed by reacting a coniferous bark of the group consisting of hemlock, spruce, redwood, Douglas fir, white fir, and southern yellow pine with an alkaline compound in aqueous solution and separating an aqueous solution of the alkali-bark derivative from the unreacted bark, said alkali-bark derivative having a formaldehyde reactivity of at least 5%, and an aqueous solution of a polymethylol phenol compound having a mole ratio of formaldehyde to phenol of from about 2.0 to 3.0 mixed with the alkali-bark derivative, said aqueous solution of polymethylol phenol compound comprising a mixture of monomeric polymethylol phenols and low condensation products, said polymethylol compound being capable of condensing with the bark derivative on application of heat to form an insoluble and infusible resin.

7. The process of preparing an adhesive composition which comprises digesting a coniferous bark of the group consisting of hemlock, spruce, Douglas fir, white fir, redwood, and southern yellow pine in an aqueous solution of an alkaline compound in the proportion of about 0.03 to 0.2 part of $Na_2O$ equivalent per part of dry bark until the alkali is substantially all combined with the bark, separating a solution of alkali-bark derivative from the unreacted bark, and mixing the solution of alkali-bark derivative with an aqueous solution of a polymethylol phenol compound having a mole ratio of formaldehyde to phenol of from 2.0 to 3.0 and in such proportion that on heating the composition the phenol compound reacts with phenolic constituents of the alkali-bark derivative to form an insoluble, infusible resin.

8. In the process of claim 7, producing an alkali-bark derivative by digesting hemlock bark with a sodium sulfide solution.

9. In the process of claim 7, adding to the alkali-bark derivative as the polymethylol phenol a mixture comprising trimethylol phenol.

10. In the process of claim 7, producing an alkali-bark derivative by digesting hemlock bark with a sodium hydroxide solution.

11. In the process of claim 7, preparing the polymethylol phenol compound by reacting a phenol having the two ortho and para hydrogen positions free with from 0.55 to 1.0 mole ratio of sodium hydroxide and from 2.0 to 3.0 mole ratios of formaldehyde to phenol in aqueous solution and adding the solution together with its reaction products to the alkali-bark derivative.

12. An aqueous thermosetting composition comprising resorcinol, an alkali bark derivative from a coniferous bark prepared by digesting coniferous bark with an aqueous solution of an alkaline compound of the group consisting of NaOH, KOH, $NH_4OH$, $Na_2S$, $K_2S$ and $(NH_4)_2S$ and removing the water-soluble alkali-bark derivative from the unreacted bark, said alkali-bark derivative having a formaldehyde reactivity of at least 5% and a water-soluble alkaline polymethylol phenol compound in which the mole ratio of formaldehyde to phenol is from 2.0 to 3.0 of the group consisting of polymethylol phenol, polymethylol metacresol and condensation products thereof and in which the ratio of polymethylol phenol compound to resorcinol and alkali bark derivative is at least 0.67 mole per mole of resorcinol plus 0.2 mole per 100 g. of alkali bark derivative, said composition being condensible by heat to an insoluble, infusible resin.

13. A thermosetting composition according to claim 12 in which the alkali-bark derivative is from a bark of the group consisting of hemlock, spruce, Douglas fir, white fir, redwood and southern yellow pine.

14. An aqueous thermosetting composition according to claim 12 in which the alkali-bark derivative is an aromatic hydroxy compound obtained by heating a coniferous bark of the group consisting of hemlock, spruce, Douglas fir, white fir, redwood, and southern yellow pine in a water solution of an alkaline compound in the proportion of about 0.03 to about 0.20 part of $Na_2O$ equivalent per part of dry bark until the alkali is substantially all combined with the bark and separating from the bark in an aqueous solution the alkali-bark derivative.

15. An aqueous thermosetting composition according to claim 12 in which the polymethylol phenol is present in amount sufficient to release enough formaldehyde to polymerize the resorcinol and the phenolic constituent of the alkali-bark derivative.

16. The process of preparing an aqueous thermosetting composition which comprises digesting a coniferous bark of the group consisting of hemlock, spruce, Douglas fir, white fir, redwood, and southern yellow pine in an aqueous solution of an alkaline compound of the group consisting of sodium hydroxide, potassium hydroxide, ammonium hydroxide, sodium sulfide, potassium sulfide and ammonium sulfide in the proportion of about 0.03 to 0.2 part of $Na_2O$ equivalent per part of dry bark until the alkali is substantially all combined with the bark, separating a solution of alkali-bark derivative from the unreacted bark, and mixing the solution of alkali-bark derivative and resorcinol with an aqueous solution of a polymethylol phenol compound having a mole ratio of formaldehyde to phenol of from 2.0 to 3.0 of the group consisting of polymethylol phenol, polymethylol metacresol and low molecular condensation products thereof and in such proportion that on heating the composition formaldehyde of the phenol compound will form an insoluble, infusible resin in combining with the resorcinol and phenolic constituents of the alkali-bark derivative.

17. In the process of claim 16, adding a polymethylol phenol compound having a mole ratio of formaldehyde to phenol closely approximating 3.0.

18. In the process of claim 16, adding trimethylol phenol to the alkali-bark derivative as the polymethylol phenol.

19. In the process of claim 16, preparing the polymethylol phenol compound by reacting a phenol having the two ortho and para hydrogen positions free with from 0.55 to 1.0 mole ratio of sodium hydroxide and from 2.0 to 3.0 mole ratios of formaldehyde to phenol in aqueous solution and adding the solution together with its reaction products to the resorcinol and the alkali-bark derivative.

References Cited by the Examiner

UNITED STATES PATENTS

| | | | |
|---|---|---|---|
| 1,802,390 | 4/1931 | Novotny | 260—54 |
| 2,053,850 | 9/1936 | Sturken | 260—6 |
| 2,437,710 | 3/1948 | Rhodes | 260—54 |
| 2,574,784 | 11/1951 | Heritage | 260—17.2 |
| 2,574,785 | 11/1951 | Heritage | 260—17.2 |
| 2,773,847 | 12/1956 | Pauley | 260—17.2 |

OTHER REFERENCES

Carswell: Phenoplasts, Interscience Publishers, New York, 1947, pp. 18 and 19.

Carswell: Phenoplasts, Interscience Publishers, New York, 1947, page 12.

JOSEPH L. SCHOFER, *Primary Examiner.*

D. ARNOLD, LEON J. BERCOVITZ, *Examiners.*